United States Patent
Hoyles et al.

(10) Patent No.: US 7,670,649 B2
(45) Date of Patent: *Mar. 2, 2010

(54) AMPHIPHILIC BLOCK COPOLYMER-TOUGHENED EPOXY RESINS AND AMBIENT CURE HIGH-SOLIDS COATINGS MADE THEREFROM

(75) Inventors: Stephen M. Hoyles, Lake Jackson, TX (US); Kandathil E. Verghese, Lake Orion, MI (US)

(73) Assignee: Dow Global Technologies, Inc., Midland, MI (US)

( * ) Notice: Subject to any disclaimer, the term of this patent is extended or adjusted under 35 U.S.C. 154(b) by 227 days.

This patent is subject to a terminal disclaimer.

(21) Appl. No.: 11/663,804

(22) PCT Filed: Nov. 2, 2005

(86) PCT No.: PCT/US2005/039961

§ 371 (c)(1),
(2), (4) Date: Aug. 13, 2007

(87) PCT Pub. No.: WO2006/052725

PCT Pub. Date: May 18, 2006

(65) Prior Publication Data

US 2008/0260955 A1    Oct. 23, 2008

Related U.S. Application Data

(60) Provisional application No. 60/626,606, filed on Nov. 10, 2004.

(51) Int. Cl.
*B05D 3/02* (2006.01)
(52) U.S. Cl. .................................... 427/386
(58) Field of Classification Search ........... None
See application file for complete search history.

(56) References Cited

U.S. PATENT DOCUMENTS

| | | | |
|---|---|---|---|
| 3,662,030 A | * | 5/1972 | Wu ............................ 558/105 |
| 3,804,735 A | | 4/1974 | Radlove et al. |
| 3,892,819 A | | 7/1975 | Najvar |
| 3,948,698 A | | 4/1976 | Elrick et al. |
| 4,014,771 A | | 3/1977 | Rosenkranz et al. |
| 4,119,609 A | | 10/1978 | Allen et al. |
| 4,431,782 A | | 2/1984 | Harris et al. |

(Continued)

FOREIGN PATENT DOCUMENTS

JP    H9-324110    12/1997

OTHER PUBLICATIONS

Journal of Polymer Science, Part B: Polymer Phusics, 2001, 39(23), 2996-3010.

(Continued)

*Primary Examiner*—Erma Cameron

(57) ABSTRACT

A curable ambient cure high-solids coating composition including
(a) an epoxy resin;
(b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units; such that when the epoxy resin composition is cured, the toughness of the resulting cured epoxy resin composition is increased; and
(c) a sufficient amount of a nitrogen-containing curing agent to cure the coating composition at ambient temperature of less than about 60° C.

23 Claims, 2 Drawing Sheets

U.S. PATENT DOCUMENTS 5,600,019 A 2/1997 Bhattacharjee et al.
6,710,139 B2 * 3/2004 Hoyles et al. ............... 525/533
2004/0247881 A1 * 12/2004 Dean et al. ................. 428/413

OTHER PUBLICATIONS

Journal of the American Chemical Society, 1997, 119(11), 2749-2750.
Macromolecules, 2000, 33(26) 9522-9534.
Journal of Applied Polymer Science, 1994, 54, 815.
Macromolecules, 2000, 33, 5235-5244.
Macromolecules, 2002, 35, 3133-3144.
Whitmarsh, R.H., In Nonionic Surfactants Polyoxyalkylene Block Copolymers; Nace, V.M., Ed.; Surfactant Science Series; vol. 60; Marcel Dekker, N.Y., 1996; Chapter 1.
Lee and Neville, Handbook of Epoxy Resins, Chapter 2, McGraw Hill, N.Y. (1967).

* cited by examiner

US 7,670,649 B2

AMPHIPHILIC BLOCK COPOLYMER-TOUGHENED EPOXY RESINS AND AMBIENT CURE HIGH-SOLIDS COATINGS MADE THEREFROM

CROSS REFERENCE TO RELATED APPLICATION

This application is a 371 of PCT/US2005/039961 filed Nov. 2, 2005, which claims the benefit of U.S. Provisional Application Ser. No. 60/626,606 filed Nov. 10, 2004.

FIELD OF THE INVENTION

The present invention relates to ambient cure high-solids coating epoxy resin compositions modified with amphiphilic polyether block copolymers to increase the fracture resistance or toughness of the cured ambient cure high-solids coating composition.

By "ambient cure" it is meant a coating that can be applied and cured below 60° C.

By "high-solids", with reference to a blended, sprayable formulation (a wet paint), means that such formulation contains less than 420 grams per liter solvent.

By "toughness", with reference to a coating, means that such a coating can relieve stress that otherwise leads to poor impact resistance via a mechanism other than lowering the polymer modulus or by plasticization (for example, cavitation of the phase separated particles of additive).

By "flexible", with reference to a coating, means that poor impact resistance of a coating is reduced by lowering the modulus or by plasticization of the polymer forming the coating, both of which in general reduce the coating's glass transition temperature.

BACKGROUND OF THE INVENTION

Epoxy resins are typically cured with hardeners or curing agents, and when cured, the resins are known for their thermal and chemical resistance. The cured epoxy resins also display good mechanical properties but they lack toughness and tend to be very brittle upon cure. The lack of toughness of the resins is especially true as the crosslink density or Tg of the resins increases.

Epoxy resins are typically used for preparing high solids ambient cure coating compositions. High solids ambient cure epoxy coatings that have good toughness are also known, but an improvement in resin toughness most often comes at the expense of other properties of the resin. Heretofore, it has been difficult to develop ambient cure coatings that combine all of the good application properties as well as toughness in one system.

Several methods have been proposed to improve the flexibility of high solids ambient cure epoxy coatings but each method has at least one disadvantage associated with it that has limited its wide application.

For example, aliphatic backbone modification can be used to impart flexibility in these systems. The aliphatic modification can be introduced to the thermoset network through the epoxy or curing agent. The disadvantage of this approach is that the glass transition temperature, chemical resistance and corrosion resistance are all negatively impacted by the aliphatic chain segment. Cure speed can also be negatively impacted if an aliphatic epoxy is utilized to modify the system.

Another known process involves the use of plasticizers, which can be added to a high solids ambient cure epoxy coating to increase its flexibility. Much like the aliphatic backbone modification this can negatively impact coating performance. Plasticizers have the added disadvantage of either volatilizing or leaching from the film with time causing embrittlement.

Still another known method is the use of carboxyl-terminated butadiene-acrylonitrile (CTBN) rubber. CTBN is a second phase toughener used in high solids ambient cure epoxy coatings. Because the second phase morphology is a function of cure conditions the performance of CTBN modified systems is a function of the cure schedule. CTBN also increases the viscosity of the modified resin thus limiting its use in high solids systems, as large amounts are needed to attain a significant improvement in toughness and ductility. CTBN is also known to depress the glass transition temperature of the system.

Recently, there have been several studies related to increasing the fracture resistance or toughness of epoxy resins by adding to the epoxy resin various block copolymers. Much of the previous work is focused on the use of amphiphilic diblock copolymers having an epoxy miscible block and an epoxy immiscible block in which the epoxy miscible block is poly(ethylene oxide) (PEO) and the immiscible block is a saturated polymeric hydrocarbon. Although effective at providing templated epoxies with appealing property sets, the known block copolymer materials are too expensive to be used in some applications.

For example, Journal of Polymer Science, Part B: Polymer Physics, 2001, 39(23), 2996-3010 discloses that the use of a poly(ethylene oxide)-b-poly(ethylene-alt-propylene) (PEO-PEP) diblock copolymer provides micellar structures in cured epoxy systems; and that block copolymers self-assembled into vesicles and spherical micelles can significantly increase the fracture resistance of model bisphenol A epoxies cured with a tetrafunctional aromatic amine curing agent. And, Journal of the American Chemical Society, 1997, 119(11), 2749-2750 describes epoxy systems with self-assembled microstructures brought using amphiphilic PEO-PEP and poly(ethylene oxide)-b-poly(ethyl ethylene) (PEO-PEE) diblock copolymers. These block copolymer containing-systems illustrate characteristics of self-assembly.

Other block copolymers incorporating an epoxy-reactive functionality in one block have been used as modifiers for epoxy resins to achieve nanostructured epoxy thermosets. For example, Macromolecules, 2000, 33(26) 9522-9534 describes the use of poly(epoxyisoprene)-b-polybutadiene (BIxn) and poly(methylacrylate-co-glycidyl methacrylate)-b-polyisoprene (MG-I) diblock copolymers that are amphiphilic in nature and are designed in such a way that one of the blocks can react into the epoxy matrix when the resin is cured. Also, Journal of Applied Polymer Science, 1994, 54, 815 describes epoxy systems having submicron scale dispersions of poly(caprolactone)-b-poly(dimethylsiloxane)-b-poly(caprolactone) triblock copolymers.

While some of the previously known diblock and triblock copolymers mentioned above are useful for improving the toughness of epoxy resins, the preparation of such previously known block copolymers is complicated. The previously known block copolymers require multiple steps to synthesize and therefore are less economically attractive from a commercial standpoint.

Still other self-assembled amphiphilic block copolymers for modifying thermosetting epoxy resins to form nanostructured epoxy thermosets are known. For example, Macromolecules, 2000, 33, 5235-5244 and Macromolecules, 2002, 35, 3133-3144, describe the addition of a poly(ethylene oxide)-b-poly(propylene oxide) (PEO-PPO) diblock and a poly(ethylene oxide)-b-poly(propylene oxide)-b-poly(ethylene oxide) (PEO-PPO-PEO) triblock to an epoxy cured with methylene dianiline, where the average size of the dispersed phase in the diblock-containing blends is of the order of 10-30 nanometers (nm). And, a polyether block copolymer such as a PEO-PPO-PEO triblock is also known to be used with an epoxy resin as disclosed in Japanese Patent Application Publication No. H9-324110.

While some of the previously known diblock and triblock copolymers mentioned above are useful for improving the toughness of epoxy resins, there is still a need in the ambient cure high solids coatings industry to further enhance the toughness of the epoxy resin used in ambient cure high solids coatings applications while maintaining all other crucial properties of the resin.

It is therefore desired to provide an alternative block copolymer that is useful for improving the toughness of thermosetting epoxy resins by a self assembly process without any of the disadvantages of the previously known block copolymers.

SUMMARY OF THE INVENTION

The present invention is directed to a ambient cure high-solids coating composition comprising (a) an epoxy resin;

(b) an amphiphilic block copolymer containing at least one epoxy resin miscible block segment and at least one epoxy resin immiscible block segment; wherein the immiscible block segment comprises at least one polyether structure; such that when the epoxy resin composition is cured, the toughness of the resulting cured epoxy resin composition is increased; and (c) a sufficient amount of a nitrogen-containing curing agent to cure the coating composition at a temperature of less than 60° C.

One embodiment of the present invention is directed to an epoxy resin modified with an amphiphilic polyether block copolymer containing an immiscible block segment comprising at least one polyether structure provided that the polyether structure of said immiscible block segment contains at least one or more alkylene oxide monomer units having at least four carbon atoms.

Previously, it has been difficult to develop high solids ambient cure epoxy coatings that display a combination of good chemical resistance, good corrosion resistance, good toughness, and good application properties at such levels that the coating could be used in an environment where the coatings are easy to apply and required to protect the substrate from both mechanical stress and corrosion. By adding a block copolymer toughening agent of the present invention, that self assembles at the sub-micron length-scale, to an epoxy resin system the goal of combining all of the properties including good chemical resistance, good corrosion resistance, good toughness, and good application properties in one high solids ambient cure epoxy coating system is achieved.

One objective of the present invention is to use an epoxy resin modified with an amphiphilic polyether block copolymer for coating applications.

Some of the beneficial features of using the amphiphilic polyether block copolymer of the present invention to toughen epoxy resins include, for example: (1) the self assembly characteristics of the amphiphilic polyether block copolymer; (2) the ability of the amphiphilic polyether block copolymer to assemble at a sub-micron length scale; (3) the ability of the amphiphilic polyether block copolymer to create a very uniform dispersion across the entire resin monomer matrix; and (4) the ability to use low loading levels of the amphiphilic polyether block copolymer toughening agent to achieve toughening results.

Some of the advantages of using the amphiphilic polyether block copolymer of the present invention include, for example: (1) the ability of the amphiphilic polyether block copolymer to improve toughness of the host resin without adversely affecting other key properties of the host resin such as glass transition temperature, modulus and viscosity; and (2) with the appropriately designed amphiphilic polyether block copolymer structure, the ability to consistently and reproducibly create morphology prior to or during the curing of the epoxy resin itself.

DESCRIPTION OF THE PREFERRED EMBODIMENTS

Figure 1:
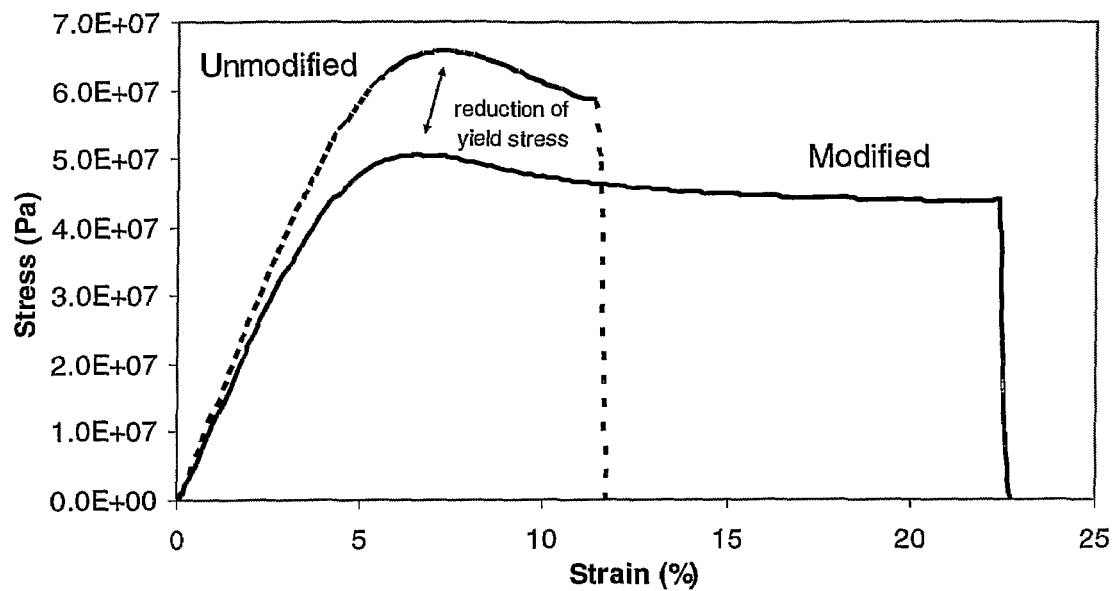
FIG. 1 is a graphical illustration showing a tensile stress-strain graph for 0 percent modification and 10 wt percent modification.

The present invention includes a high solids ambient cure composition with improved toughness comprising an epoxy resin modified with an amphiphilic block copolymer, such as a polyether block copolymer, as a toughening agent for the resin. These modified epoxy resins, when cured, show impressive improvements in inherent toughness (defined by the introduction of yielding followed by a pronounced increase in elongation at break in the thin film tensile tests which increases the area under the stress-strain curve) with only minor changes in modulus and glass transition temperature (Tg) behavior.

Templated thermoset epoxy polymers materials, with sub-micron self-assembled morphologies, exhibit an attractive combination of improved toughness and retention of material properties such as modulus and Tg. The thermoset epoxy polymers can be prepared, for example, by dispersing an amphiphilic polyether block copolymer in a resin monomer matrix, where the copolymer can undergo self-assembly, and then curing the resin. Self-assembled resins that exhibit surfactant-like morphologies provide enhanced fracture toughness at very low (for example, from 1 volume percent (vol. percent) to 10 vol. percent) block copolymer loadings. Amphiphilic block copolymers that are capable of self assembly when mixed with the resin monomer must have at least one block that is miscible with the resin/curing agent mixture prior to complete cure, and at least one block that is immiscible with the resin/curing agent mixture prior to complete cure.

One embodiment of the present invention is aimed at preparing an all polyether block copolymer, for example, a diblock copolymer, such as those based on poly(ethylene oxide)-b-(butylene oxide) (PEO-PBO), that self assembles in the epoxy resin system. At sufficiently high butylene oxide block lengths (for example, Mn=1000 or greater) these block structures are found to be effective at templating the resin monomer into micellar structures such as spherical micelles.

The required elements in the present invention are an epoxy resin monomer system (either as a single epoxy resin component, or as a combination of two or more epoxy resin components), and a polyether block copolymer in which one or more blocks is polyethylene oxide or any other epoxy miscible structure and the other block(s) is a polyalkylene oxide (for example, 1,2-epoxybutane, 1,2-epoxyhexane, 1,2-epoxydodecane) or other epoxy immiscible polymer or oligomer. The components of the present invention may be mixed neat or with the assistance of a solvent; and then cured with a nitrogen-containing epoxy curing agent such as an amine to provide an insoluble epoxy thermoset containing the dispersed polyether block copolymer.

A high-solids ambient cure epoxy formulation is toughened by adding, for example, from 1 volume percent (vol. percent) to 10 vol. percent of a polyether block copolymer such as a PEO-PBO diblock copolymer or a PEO-PBO-PEO triblock copolymer. The PEO-PBO diblock copolymer and the PEO-PBO-PEO triblock copolymer additives are representatives of polyether block copolymers that are capable of self-assembly in the host epoxy matrix. The addition of either of these block copolymers do not have significant negative impact on the application properties (for example, glass transition temperature, $T_g$) of the epoxy system or on the final chemical and corrosion resistance of the epoxy system.

The polyether block copolymers disclosed herein have the advantage of being able to be added to wet paint after manufacture. Thus, a finished paint can be flexiblized just before application when need be. This can be useful in applications such as automotive refinish where plastic bumpers of a car require a coating with more flexibility than the rest of the car. Having a post addable flexibilizer eliminates the need to have a second coating specifically for plastic bumpers.

The second phase tougheners (polyether block copolymers), disclosed herein, also have the advantage of being effective at lower levels than previously known aliphatic backbone modification, plasticization or CTBN addition. At least partly because the tougheners of the present invention are effective at low levels, their potentially negative effect on price, glass transition temperature, cure speed, chemical resistance, corrosion resistance and viscosity are minimized.

The amphiphilic polyether block copolymer useful in the present invention may include any block copolymer containing an epoxy resin miscible block segment comprising at least one polyether structure; and an epoxy resin immiscible block segment comprising at least one polyether structure.

Preferably, the polyether block copolymer useful in the present invention includes one or more polyether block copolymers comprising at least one epoxy miscible polyether block segment derived from an alkylene oxide such as ethylene oxide (EO) and at least one epoxy immiscible polyether block segment derived from an alkylene oxide with at least greater than 3 carbon atoms, for example 1,2-epoxy butane known commonly as butylene oxide (BO). The immiscible block segment may also be comprised of mixtures of $C_4$ or higher carbon analogue monomers that are copolymerized together to provide the immiscible block segment. The immiscible block may also contain lower molecular weight co-monomers such as EO. The polyether block copolymer contains at least one epoxy resin miscible polyether block segment, E, and at least one epoxy resin immiscible polyether block segment, M.

The present invention polyether block copolymer component may contain at least two or more amphiphilic polyether block copolymer segments. Examples of the amphiphilic polyether block copolymer may be selected from the group consisting of a diblock (EM); a linear triblock (EME or MEM); a linear tetrablock (EMEM); a higher order multiblock structure $(EMEM)_xE$ or $(MEME)_xM$, where X is an integer value ranging from 1-3; a branched block structure; or a star block structure; and any combination thereof. The amphiphilic polyether block copolymer consisting of the branched block structures or star block structures contains at least one epoxy monomer miscible block and at least one epoxy monomer immiscible block.

Examples of the epoxy resin miscible polyether block segment, E, include a polyethylene oxide block, a propylene oxide block, a poly(ethylene oxide-co-propylene oxide) block, a poly(ethylene oxide-ran-propylene oxide) block and mixtures thereof. Preferably, the epoxy resin miscible polyether block segment useful in the present invention is a polyethylene oxide block.

Generally, the epoxy resin immiscible polyether block segment, M, useful in the present invention is an epoxidized alpha olefin having carbon atoms of from $C_4$ to $C_{20}$. Examples of the epoxy resin immiscible polyether block segment, M, include a polybutylene oxide block, a polyhexylene oxide block derived from 1,2 epoxy hexane, a polydodecylene oxide block derived from 1,2-epoxy dodecane, and mixtures thereof. Preferably, the epoxy resin immiscible polyether block segment useful in the present invention is a polybutylene oxide block.

In another embodiment of the present invention, when the polyether block copolymer has a multiblock copolymer structure, other block segments in addition to E and M may be present in the block copolymer. Examples of other miscible segments of the block copolymer include polyethylene oxide, polymethyl acrylate, and mixtures thereof. Examples of other immiscible segments of the block copolymer include polyethylene propylene (PEP), polybutadiene, polyisoprene, polydimethyl siloxane, polybutylene oxide, polyhexylene oxide, polyalkyl methyl methacrylate, such as polyethyl hexyl methacrylate, and mixtures thereof.

The amphiphilic polyether block copolymers which can be employed in the practice of the present invention include for example, but are not limited to, a diblock copolymer, a linear triblock, a linear tetrablock, a higher order multiblock structure, a branched block structure, or star block structure. For example, the polyether block copolymer may contain a poly(ethylene oxide) block, a poly(propylene oxide) block or a poly(ethylene oxide-co-propylene oxide) block; and an alkylene oxide block based on a $C_4$ or higher carbon analog block, such as, for example, 1,2-epoxybutane, 1,2-epoxyhexane, 1,2-epoxydodecane, or 1,2-epoxyhexadecane block. Other examples of the alkylene oxide blocks may include Vikolox™ epoxidized alpha olefins, including C10-C30+ olefins, commercially available from Atofina.

Preferred examples of suitable block copolymers useful in the present invention include amphiphilic polyether diblock copolymers such as, for example, poly(ethylene oxide)-b-poly(butylene oxide)(PEO-PBO); and amphiphilic polyether triblock copolymers such as, for example, poly(ethylene oxide)-b-poly(butylene oxide)-b-poly(ethylene oxide) (PEO-PBO-PEO).

The amphiphilic polyether block copolymer used in the present invention can have a number average molecular weight (Mn) of from 1,000 to 30,000, for the combination of both block lengths. Most preferably, the molecular weight of the polyether block copolymer is between 3,000 and 20,000. Prior art materials derived from block copolymers in which the immiscible block has a very low solubility parameter (polymeric hydrocarbons) microphase separate prior to cure. The polyether containing block structures of the present invention, on the other hand, can either be microphase separated prior to cure at the preferred molecular weights, or form micelles while the curing process is being performed.

The composition of the block copolymer can range from 90 percent epoxy resin miscible polyethylene oxide block and 10 percent epoxy resin immiscible polyalkylene oxide block to 10 percent epoxy resin miscible polyalkylene oxide block and 90 percent epoxy resin immiscible polyalkylene oxide block.

Small amounts of homopolymers from each of the respective block segments may be present in the final amphiphilic polyether block copolymer of the present invention. For example, from 1 weight percent to 50 weight percent, preferably from 1 weight percent to 10 weight percent, of a homopolymer that is similar or identical in structure with the miscible or the immiscible block can be added to the composition of the present invention comprising the epoxy monomer system and an amphiphilic polyether block copolymer. Additional polymers or oligomers can also be added to the block copolymer to affect its self assembled morphology in the finished coating. These additional polymers would partition themselves to the immiscible domain thus changing its morphology.

The amount of amphiphilic polyether block copolymers employed in the epoxy resin composition of the present invention depends on a variety of factors including the equivalent weight of the polymers, as well as the desired properties of the products made from the composition. In general, the amount of amphiphilic polyether block copolymers employed in the present invention may be from 0.1 vol. percent to 30 vol. percent, preferably from 0.5 vol. percent to 10 vol. percent and, most preferably, from 1 vol. percent to 5 vol. percent, based on the volume of the cured coating.

The amphiphilic polyether block copolymers of the present invention preferably increase the toughness or fracture resistance of the epoxy resin, preferably at low loadings of block copolymer (for example less than 10 vol. percent) in the epoxy resin composition. Generally, addition of from 1 vol. percent to 10 vol. percent of a polyether block copolymer to the epoxy resin composition increases the toughness of the composition by a factor of 1.5 times to 4 times that of a control.

The present invention ambient cure high solids epoxy coating formulation may contain at least one or more amphiphilic polyether block copolymers mixed with the thermosetting epoxy resin. In addition, two or more different amphiphilic block copolymers may be blended together to make up the block copolymer component of the present invention so long as one of the block copolymers is a polyether block copolymer. More than one block copolymer can be combined to gain additional control of the nanostructure, that is, shape and dimension.

In addition to the polyether block copolymer used in the resin composition, other amphiphilic block copolymers may be used as a secondary block copolymer component in the resin composition of the present invention. Examples of additional amphiphilic block copolymers, other than the polyether block copolymers of the present invention, which can be employed in the practice of the present invention include for example, but are not limited to, poly(ethylene oxide)-b-poly(ethylene-alt propylene) (PEO-PEP), poly(isoprene-ethylene oxide) block copolymers (PI-b-PEO), poly(ethylene propylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-b-methylmethacrylate) block copolymers (PI-b-PEO-b-PMMA); and mixtures thereof. Generally, the amount of secondary amphiphilic block copolymer used in the resin composition may be from 0.1 volume percent to 30 volume percent.

The polyether block copolymers of the present invention provide uniformly dispersed and uniformly scaled sub-micron sized structures which preferably form (template) in the liquid resin matrix due to micellization brought by the balance of immiscibility of one block segment and miscibility of the other block segment. The micellar structures are preserved into the cured epoxy thermoset, or form during the curing process, producing epoxy thermoset materials exhibiting improved toughness, improved fracture resistance, impact resistance while maintaining Tg, modulus and other properties at the same level as the unmodified epoxy thermoset. The micellar morphology of the nano-templated resin can be for example, spherical, worm-like, and vesicles. Micellar morphologies are advantageously obtained at low (for example, less than 5 volume percent) concentrations of block copolymer; that is, the morphological features are not associated with one another or packed into a three dimensional lattice. At higher concentrations self-assembled structures can form spherical, cylindrical, or lamellar morphological features that are associated with one another by lattice interactions, also at a nanometer size scale.

It is believed that the increase in fracture resistance occurs when the block copolymers self-assemble into a sub-micron sized morphology such as worm-like, vesicle or spherical micelle morphology. While it is not well understood how to predict which micelle morphology, if any will occur in different resins, it is believed that some of the factors that determine the self-assembled morphology may include, for example, (i) the choice of monomers in the block copolymer, (ii) the degree of asymmetry in the block copolymer, (iii) the molecular weight of the block copolymer, (iv) the composition of the epoxy resin, and (v) the choice of curing agent for the resin.

As an illustration of one embodiment of the present invention, an epoxy resin may be blended with a polyether block copolymer, for example, a poly(ethylene oxide)-b-poly(butylene oxide) (PEO-PBO) diblock copolymer wherein the PBO is the epoxy immiscible hydrophobic soft component of the diblock copolymer and the PEO is the epoxy miscible component of the diblock copolymer. The curable epoxy resin composition including the PEO-PBO diblock copolymer increases the impact resistance of the cured epoxy resin body.

The PEO-PBO block copolymer can be indicated generally by the chemical formula $(PEO)_x-(PBO)_y$ wherein the subscripts x and y are the number of monomer units of polyethylene oxide and polybutylene oxide in each block, respectively and are positive numbers. Generally, x should be from 15 to 85 and the molecular weight of the structural part $(PEO)_x$ should be from 750 to 100,000. Subscript y should be from 15 to 85 and the molecular weight represented by the structural part $(PBO)_y$ should be from 1,000 to 30,000. Also, a single PEO-PBO diblock copolymer may be used alone, or more than one PEO-PBO diblock copolymer may be combined to be used as well.

In one embodiment of the present invention, a PEO-PBO block copolymer is used, wherein the diblock copolymer has 20 percent PEO and 80 percent PBO to 80 percent PEO and 20 percent PBO; and has block sizes of molecular weights (Mn) of PBO 2000 or higher and molecular weights of PEO 750 or higher; and provides various self-assembled morphologies. For example, the present invention includes a diblock with a PBO block length of from 2,500 to 3,900 that provides spherical micelles. Another example of the present invention includes a diblock with a PBO segment of 6,400 that provides worm-like micelles. Still another example of the present invention is a diblock with a short (Mn=750) PEO block segment that provides an agglomerated vesicle morphology. Yet another example of the present invention includes a mixture of a PEO-PBO diblock with a low molecular weight PBO homopolymer that provides a spherical micelle in which the PBO homopolymer sequesters into the micelle without forming a separate macrophase; the PBO homopolymer macrophase separates when added without the diblock present.

In general, the amphiphilic polyether block copolymers used in the present invention can be prepared in a single sequential synthetic polymerization process, wherein one monomer is polymerized to prepare an initial block, followed by simple introduction of the second monomer type which is then polymerized onto the terminus of the first block copolymer until the polymerization process is complete. It is also possible to make the blocks separately, preparing the first block and then polymerizing the second block onto the terminus of the first block in a second synthetic step. The difference in solubility of the two block fragments is sufficient that the block copolymer may be used to modify a variety of epoxy materials.

The block copolymers can be prepared by Group I metals such as sodium, potassium or cesium moderated anionic polymerization. The polymerization can be carried out neat or using a solvent. The temperature of the polymerization reaction can be for example from 100° C. to 140° C. at atmospheric pressure to slightly above atmospheric pressure. The synthesis of the block copolymer may be carried out, for example, as described in Whitmarsh, R. H., In Nonionic Surfactants Polyoxyalkylene Block Copolymers; Nace, V. M., Ed.; Surfactant Science Series; Vol. 60; Marcel Dekker, N.Y., 1996; Chapter 1.

In a preferred embodiment, the block segments of the block copolymers are prepared by the ring-opening polymerization of 1,2-epoxy alkenes.

A thermoset material is defined as being formed of polymer chains of variable length bonded to one another via covalent bonds, so as to form a three-dimensional network. Thermoset, epoxy materials can be obtained, for example, by reaction of a thermosetting epoxy resin with a hardener such as of an amine type.

Epoxy resins useful in the present invention include a wide variety of epoxy compounds. Typically, the epoxy compounds are epoxy resins which are also referred to as polyepoxides. Polyepoxides useful herein can be monomeric (for example, the diglycidyl ether of bisphenol A, novolac-based epoxy resins, and tris-epoxy resins), higher molecular weight advanced resins (for example, the diglycidyl ether of bisphenol A advanced with bisphenol A) or polymerized unsaturated monoepoxides (for example, glycidyl acrylates, glycidyl methacrylate, allyl glycidyl ether), homopolymers or copolymers. Most desirably, epoxy compounds contain, on the average, at least one pendant or terminal 1,2-epoxy group (that is, vicinal epoxy group) per molecule.

Examples of polyepoxides useful in the present invention include, but are not limited to, the polyglycidyl ethers of both polyhydric alcohols and polyhydric phenols; polyglycidyl amines; polyglycidyl amides; polyglycidyl imides; polyglycidyl hydantoins; polyglycidyl thioethers; epoxidized fatty acids or drying oils; epoxidized polyolefins; epoxidized di-unsaturated acid esters; epoxidized unsaturated polyesters; and mixtures thereof.

Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Polyepoxides can include the epoxidized cyclo-olefins; as well as the polymeric polyepoxides which are polymers and copolymers of glycidyl acrylate, glycidyl methacrylate and allyl glycidyl ether. Suitable polyepoxides are disclosed in U.S. Pat. Nos. 3,804,735; 3,892,819; 3,948,698; 4,014,771 and 4,119,609; and Lee and Neville, Handbook of Epoxy Resins, Chapter 2, McGraw Hill, N.Y. (1967).

While the present invention is applicable to polyepoxides in general, preferred polyepoxides are glycidyl polyethers of polyhydric alcohols or polyhydric phenols having an epoxide equivalent weight (EEW) of from 150 to 3,000, preferably an EEW of from 170 to 2,000. These polyepoxides are usually made by reacting at least two moles of an epihalohydrin or glycerol dihalohydrin with one mole of the polyhydric alcohol or polyhydric phenol, and a sufficient amount of a caustic alkali to combine with the halohydrin. The products are characterized by the presence of more than one epoxide group, that is, a 1,2-epoxy equivalency greater than one.

The polyepoxide useful in the present invention can also be a cycloaliphatic diene-derived epoxide. These polyepoxides can be cured either thermally, cationically or photoinitiation (example UV initiated cure). There are several cycloaliphatic epoxides that are made and marketed by The Dow Chemical Company such as 3,4-epoxycyclohexylmethyl-3,4-epoxycyclohexyl carboxylate; 1,2-epoxy-4-vinylcyclohexane; bis(7-oxabicyclo[4.1.0]hept-3-ylmethyl hexanedioic acid ester; 3,4-epoxycyclohexanecarboxylate methyl ester; and mixtures thereof.

The polyepoxide may also include a minor amount of a monoepoxide, such as butyl and higher aliphatic glycidyl ethers, phenyl glycidyl ether, or cresyl glycidyl ether, as a reactive diluent. Such reactive diluents are commonly added to polyepoxide formulations to reduce the working viscosity thereof, and to give the formulation better substrate wetting ability. As is known in the art, a monoepoxide affects the stoichiometry of the polyepoxide formulation and adjustments are made in the amount of curing agent and other parameters to reflect that change.

Generally, the amount of polyepoxide used in the present invention may be in the range of from 10 weight percent to 95 weight percent.

The curing agent component (also referred to as a hardener or cross-linking agent) useful in the present invention may be any nitrogen-containing compound having an active group being reactive with the epoxy group of an epoxy resin. The chemistry of such curing agents is described in the previously referenced books on epoxy resins. The curing agent useful in the present invention includes nitrogen-containing compounds such as amines and their derivatives.

The nitrogen-containing curing agent of the present invention is preferably selected from polyamides such as for example the reaction products of a multifunctional amine and a dibasic acid; aromatic amines such as for example meta-phenylenediamine; aliphatic amines such as for example ethylene diamine; cycloaliphatic amines such as for example isophorone diamine; amidoamines such as for example the reaction products of a multifunctional amine and a monobasic acid; phenalkylamines such as for example the reaction product of phenol, formaldehyde and an amine; siloxane amines such as for example an amine functional polymer with a silicone containing backbone; ketimines such as for example the reaction products of a polyfunctional amine and a ketone; epoxy adducts of the amines mentioned above such as for example the reaction product of ethylene diamine and the diglycidyl ether of bisphenol A; and mixtures thereof.

The amount of curing agent used in the present invention is sufficient to cure the coating composition at a temperature of less than 60° C. Generally, the amount of curing agent used in the present invention may be in the range of from 50 mole percent curing agent to 150 mole percent curing agent.

An optional component useful as an additive in the epoxy resin composition of the present invention includes a curing catalyst. The curing catalyst may be added to the epoxy resin component of the curable composition or blended into the mixture of components in the curable composition. Examples of curing catalyst include imidazole derivatives such as 2-ethyl-4-methyl imidazole, phenols, alcohols, tertiary amines, and organic metallic salts. Preferably, the curing catalyst is used in an amount of from 0 to 20 parts by weight based on the total weight of the curable composition.

Another optional component, which may be added to the curable thermosetting epoxy resin composition of the present invention, is a solvent or a blend of solvents. The solvent used in the resin composition is preferably miscible with the other components in the resin composition. In addition, the curable resin composition of the present invention may be a clear solution or a stable dispersion depending on the optional solvents used in the composition. Examples of suitable solvents employed in the present invention include, for example, ketones, ethers, acetates, aromatic hydrocarbons, cyclohexanone, glycol ethers, and combinations thereof.

Preferred solvents are polar solvents. Lower alcohols having from 1 to 20 carbon atoms, such as, for example, isopropanol, provide good solubility and volatility for removal from the resin matrix when a compound is formed.

The total amount of solvent used in the curable epoxy resin composition generally may be between 0 and 40 weight percent.

The curable resin composition according to the present invention may also contain additives typically used in high solids ambient cure coating formulations such as other catalysts, other curing agents, other resins, fillers, dyes, pigments, thixotropic agents, surfactants, fluidity control agents, stabilizers, diluents that aid processing, adhesion promoters, flexibilizers, toughening agents, fire retardants. The pigments, polymers, and solvents and other additives that would commonly make up a high solids ambient cure epoxy can be mixed into the epoxy resin composition of the present invention. Generally, the amount of the optional additives used in the present invention may be from 0 to 50 volume percent.

In the preparation of the blend or composition of the present invention, the components of the composition are mixed together by known means in the art at conditions to form a curable composition, preferably in liquid form. The curable epoxy resin composition of the present invention can be produced by mixing all the components of the composition together in any order.

Alternatively, the curable epoxy resin composition of the present invention can be produced by preparing a first composition comprising the epoxy resin component and block copolymer; and a second composition comprising the curing agent component. All other components useful in making the resin composition may be present in the same single composition, or some may be present in the first composition, and some in the second composition. For example, the method of making the toughened resin composition includes incorporating the toughening agent into the curing agent used to cure the epoxy resin. The first composition is then mixed with the second composition to form the curable resin composition. The curable resin composition mixture is then cured to produce a resin thermoset material. Preferably, the curable epoxy resin composition is in the form of a solution, wherein the components of the composition are dissolved in a solvent. Such a solution is used for producing a coating on a substrate and a coated article.

As aforementioned, a neutral solvent may be employed in the blend to facilitate homogeneous mixing of the block copolymer, epoxy resin and curing agent. The preferred optional solvent used in the present invention may include, for example, xylene and methyl ethyl ketone (MEK). In addition, other solvent choices can also be used.

If the processing of the epoxy resin includes an advancement step, the toughening agent block copolymers can be added with the reactants prior to the advancement reaction. Thus, an alternative method of making the toughening resin consists of incorporating the toughening agent directly into an epoxy resin advancement reactor during the resin manufacturing step. In this embodiment, the composition of the present invention my include a liquid epoxy resin for example a diglycidyl ether of bisphenol-A, a polyhydric alcohol such as bisphenol-A and the block copolymer toughening agent such as an EO-BO block copolymer.

The block copolymer toughening agent can be used in concentrations of 1 vol. percent to 10 vol. percent based on the formulated solids content of the cured epoxy system used in the coating application, preferably between 5 vol. percent and 10 vol. percent. The concentration of the block copolymer toughening agent in the resin can be adjusted to provide the desired concentration in the final formulation or can be kept at higher concentration (masterbatch) and adjusted down with unmodified resin to desired final concentration.

The mixture of epoxy resin, curing agent, block copolymer and any other modifiers present in the composition can be cured according to typical processes practiced by the industry. While the temperature of curing can range generally from 5° C. to 200° C., the preferred process is an ambient temperature cure (for example, 20° C.) for the present invention. The curing processes used may include thermal, radiation or a combination of energy sources.

As is generally known, the amount of time used for curing can range generally from seconds to several hours or days depending on the curing agent and the resin components, for example, the amount of time used for curing can range generally from 1 second in the case of photo cure to 1 month in the case of room temperature cure.

The curable composition can be cured in one step or multiple steps or the curable composition can be post-cured using a different temperature or energy source after the initial cure cycle.

The present invention consists of blends of an epoxy resin suitable for making coatings with a toughening agent which can be, for example, an EO-BO block copolymer or any other copolymer of similar structure.

The curable epoxy resin composition containing the polyether block copolymers of the present invention is used for preparing an ambient cure coating composition. The ambient cure coating composition is then applied to various substrates. The ambient cure coating composition may be applied to a substrate by any well known method such as spraying, brushing, rolling, flow coating or dipping.

The use of the inventive copolymers may also be foreseen in epoxy resin based multi-functional coatings. Such coatings are used for the impact and corrosion protection and the vibration dampening treatment of metal surfaces of machines and vehicles.

The following working examples are given to illustrate the invention and should not be construed as limiting its scope. Unless otherwise indicated, all parts and percentages are by weight.

PREPARATORY EXAMPLE A

Preparation of PEO-PBO-PEO Triblock Copolymer

The basic procedure used to make the PEO-PBO-PEO triblock copolymer is based on Example 1 of U.S. Pat. No. 5,600,019. The modifications to this procedure are listed below. The final PEO-PBO-PEO triblock product contained the following molar ratio of initiator/monomers.

1 mole propylene glycol/56 moles butylene oxide/62 moles of ethylene oxide

Part A: Preparation of Catalyzed Initiator

Propylene glycol and an aqueous solution of KOH (46 weight percent solids) were used. The aqueous KOH was added to a reactor in an amount to give a final catalyst concentration of 9 weight percent. The water was not removed from the reaction product.

Part B: Preparation of Butylene Oxide Polymer

Butylene oxide was added in two batches. The amount of BO was adjusted so that an intermediate butylene oxide block had a number average molecular weight (Mn) of approximately 1000. When digestion was complete more of the aqueous KOH (46 weight percent) was added to the reactor so that the final catalyst concentration was approximately one weight percent. The water was removed from the reaction product under vacuum; then additional BO was added to the reactor to give the final butylene oxide polymer. The final butylene oxide polymer had a number average molecular weight of approximately 3500.

Part C: Preparation of Final PEO-PBO-PEO Triblock Copolymer

In order to obtain a liquid product, a mixture of ethylene oxide and butylene oxide (80/20 weight percent) was added to the butylene oxide prepared in Part B above. The incorporation of a small amount of butylene oxide in this step helps to disrupt the tendency of PEO to crystallize and form a solid. The amount of the added mixture was adjusted so that the final triblock had a number average molecular weight of approximately 6800 g/mole. The final reaction mixture was cooled to 60° C. and then neutralized through a magnesium silicate bed to give the final PEO-PBO-PEO triblock copolymer.

EXAMPLE 1

The following six systems are used in this example: three unmodified epoxy systems (one cured with Air Products' Ancamide 2353, one cured with Air Products' Ancamine 1618 and one cured with Cardolite's NC541LV); and three modified epoxy systems modified with 10 wt percent of a PEO-PBO-PEO triblock copolymer toughening agent prepared using the PREPARATORY EXAMPLE A described above. Information on the three curing agents used in this example is described in Table 1.

TABLE 1

Properties of Curing Agents.

| Trade Name | Manufacturer | Chemistry | EW | Viscosity |
|---|---|---|---|---|
| Ancamine 1618 | Air Products | IPDA adduct cut in benzyl alcohol | 113 | 450 cP |
| Ancamide 2353 | Air Products | TETA polyamide cut in benzyl alcohol | 114 | 3000 cP |
| NC 541LV | Cardolite | Phenalkamine | 125 | 2000 cP |

Panels were prepared from all six coating systems. Both tin-plated steel panels and Bonderite 1000 panels were coated using a wire wound drawdown bar. Bonderite 1000 panels were chosen in order to eliminate adhesion, as much as possible, from being the root cause to failure during the impact tests. The tin-plated steel panels were chosen because the coatings could be easily removed from them by the mercury amalgamation method for film property testing. All panels were cured over a weekend (~64 hours) in an oven set at 60° C. This cure schedule was considered aggressive enough to ensure complete conversion of the reactants without being so aggressive as to change the predominant cure reaction from epoxy-amine to epoxy-epoxy.

Figure 3:
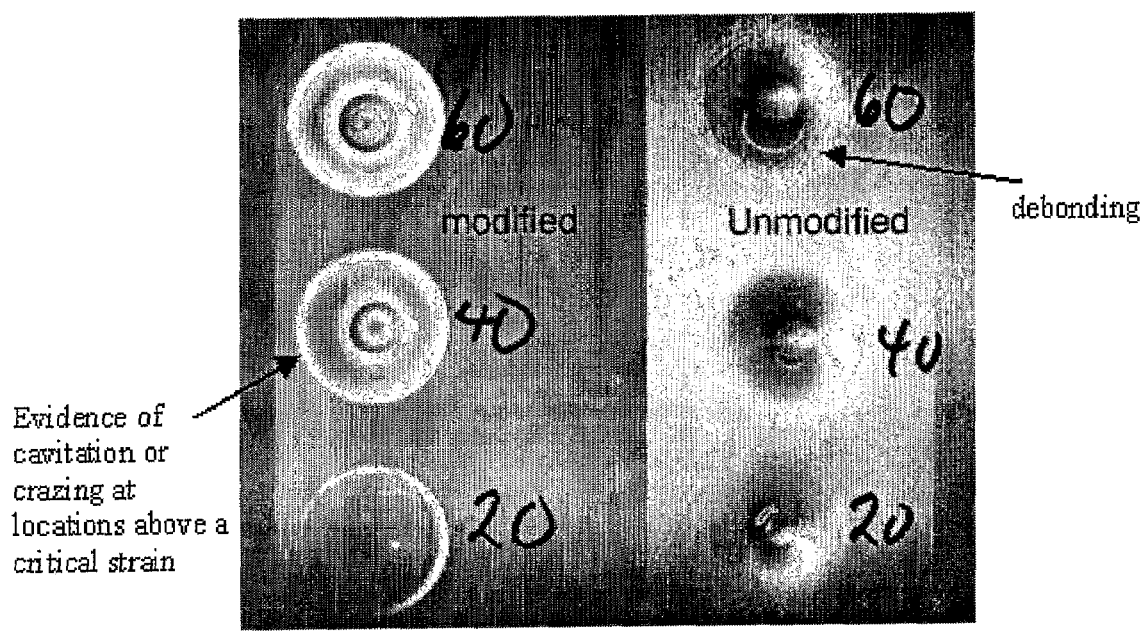
FIG. 3 contains side-by-side photographs showing the impact test results of separate coated panels for two coating systems: (a) 0 percent modification and 10 wt percent modification.

The Bonderite 1000 panels were used to evaluate the impact resistance of the modified and unmodified coating using ASTM method D2794-91. The results of this testing can be found in Table 2. In each case the 10 percent modified systems equaled or bettered the performance of their unmodified counterpart. Pictures of the impact test panel for the Ancamine 1618 cured systems are shown in FIG. 3.

TABLE 2

Mechanical Properties of Clear Coatings With and Without PEO-PBO-PEO Triblock Copolymer.

| Description | Direct Impact (inch.-pound) | $T_g$ (° C.) | Elong. @ break (percent) |
|---|---|---|---|
| 1618, 10 percent mod. | 100 | 93.7 | 9.4 |
| 1618, 0 percent mod. | 40 | 95.0 | 4.9 |
| 2353, 10 percent mod. | 100 | 100.1 | 31.6 |
| 2353, 0 percent mod. | 60 | 100.4 | 13.7 |
| NC541LV, 10 percent mod. | 40 | 85.0 | 28.0 |
| NC541LV, 0 percent mod. | 40 | 87.5 | 14.1 |

Stress-strain curves were generated from thin films on the TA Instruments RSAIII. Straight-edge samples (typically 4-mm wide, 0.1-mm thick and 10-mm long) were carefully cut from free films using scissors. Tests were run with a linear cross head speed of 0.05 mm/s at room temperature with the environmental chamber removed. In order to minimize grip-section failure, fine sand-paper (1200 grit) was used on either end as tabbing material and was placed between the sample and the grips. Representative stress-strain traces for the Ancamide 2353 cured system with and without modification is shown in FIG. 1. All samples exhibited failure in the gage region. The summary data Table 2 are based on the average of four tensile test replicates.

It can be seen in from the data in Table 2 that the modification of each of the three systems resulted in a significant increase in elongation to break regardless of the results of the impact testing; and thus, indicating that adhesion may have resulted in the lack of impact improvement for the NC541LV cured system.

Figure 2:
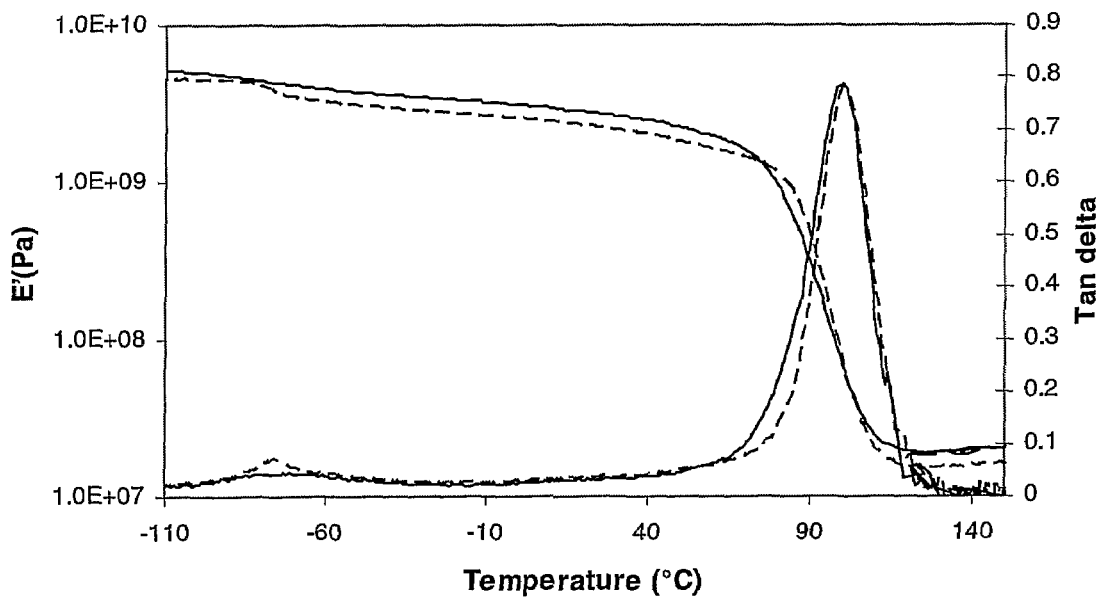
FIG. 2 is a graphical illustration showing a DMTA for 0 percent modification (solid line) and 10 wt percent modification (dashed line).

Dynamic mechanical thermal analysis (DMTA) was run in tension mode on thin films using the TA Instruments RSAIII. Samples were cut from free films with scissors. Typically, samples were 10-mm wide, 0.1-mm thick and 15-mm long. Tests were run from −110° C. to 150° C. ramping at 5° C. per minute. A frequency of 1 Hz was used. A typical tan delta curve for these systems is shown in FIG. 2. The curve in FIG. 2 was generated from the Ancamine 2353 cured systems with the dotted line representing the modified system and the solid line representing the unmodified system.

The peak of the tan delta cure was used to define the glass transition temperature of the systems. The results of this analysis are described in Table 2. As can be seen from this data, the glass transition temperature of the coating was not significantly affected by the addition of the toughening agent.

What is claimed is:

1. A curable ambient cure high-solids coating composition comprising:
   (a) an epoxy resin;
   (b) an amphiphilic block copolymer containing at least one epoxy resin miscible block segment and at least one epoxy resin immiscible block segment; wherein the immiscible block segment comprises at least one polyether structure; such that upon curing the epoxy resin composition, the toughness based on elongation at break of the resulting cured epoxy resin composition modified with said amphiphilic block copolymer is increased as compared to a cured epoxy resin composition without being modified with said amphiphilic block copolymer; and
   (c) a sufficient amount of a nitrogen-containing curing agent to cure the coating composition at ambient temperature of less than 60° C.

2. The composition of claim 1 wherein the amphiphilic block copolymer is an amphiphilic polyether block copolymer containing at least one epoxy resin miscible block segment and at least one epoxy resin immiscible block segment; wherein the miscible block segment comprises at least one polyether structure.

3. The composition of claim 1 wherein the immiscible block segment comprises at least one polyether structure provided that the polyether structure of said immiscible block segment contains at least one or more alkylene oxide monomer units having at least four carbon atoms.

4. The composition of claim 1 wherein the nitrogen-containing curing agent is an amine curing agent.

5. The composition of claim 1 wherein the nitrogen-containing curing agent is selected from the group consisting of polyamides, aromatic amines, aliphatic amines, cycloaliphatic amines, amidoamines, phenalkylamines, siloxane amines, ketimines, epoxy adducts of amines, and mixtures thereof.

6. The composition of claim 1 wherein the amphiphilic polyether block copolymer is selected from the group consisting of a diblock, a linear triblock, a linear tetrablock, a multiblock structure; a branched block structure; or a star block structure.

7. The composition of claim 1 wherein the miscible block segment contains a polyethylene oxide block, a propylene oxide block, or a poly(ethylene oxide-co-propylene oxide) block; and the immiscible block segment contains a polybutylene oxide block, a polyhexylene oxide block, or a polydodecylene oxide block.

8. The composition of claim 1 wherein at least one of the miscible segments of the amphiphilic block copolymer is a poly(ethylene oxide); and the at least one of the immiscible segments of the amphiphilic block copolymer is a poly(butylene oxide).

9. The composition of claim 1 wherein the amphiphilic block copolymer is poly(ethylene oxide)-poly(butylene oxide) or poly(ethylene oxide)-poly(butylene oxide)-poly(ethylene oxide).

10. The composition of claim 1 wherein the amphiphilic block copolymer has a molecular weight of from 1000 to 30,000.

11. The composition of claim 1 wherein the ratio of the miscible segments of the amphiphilic block copolymer to the immiscible segments of the amphiphilic block copolymer is from 10:1 to 1:10.

12. The composition of claim 1 wherein the amphiphilic block copolymer is present in an amount of from 0.1 volume percent (vol. percent) to 30 vol. percent based on the volume of the cured coating.

13. The composition of claim 1 wherein the epoxy resin is selected from the group consisting of polyglycidyl ethers of polyhydric alcohols, polyglycidyl ethers of polyhydric phenols, polyglycidyl amines, polyglycidyl amides, polyglycidyl imides, polyglycidyl hydantoins, polyglycidyl thioethers, epoxidized fatty acids, epoxidized drying oils, epoxidized polyolefins, epoxidized di-unsaturated acid esters, epoxidized unsaturated polyesters, and mixtures thereof.

14. The composition of claim 1 wherein the epoxy resin is a polyglycidyl ether of a polyhydric alcohol or a polyglycidyl ether of a polyhydric phenol.

15. The composition of claim 1 wherein the epoxy resin is selected from the group consisting of 3,4-epoxycyclohexyl-methyl-3,4-epoxycyclohexyl carboxylate; 1,2-epoxy-4-vinylcyclohexane; bis(7-oxabicyclo[4.1.0]hept-3-ylmethyl hexanedioic acid ester; 3,4-epoxycyclohexanecarboxylate methyl ester; and mixtures thereof.

16. The composition of claim 1 including a homopolymer of identical composition to the epoxy immiscible block segment.

17. The composition of claim 1 including a homopolymer of identical composition to the epoxy miscible block segment.

18. A composition of claim 1 including a polymer that is miscible in the epoxy immiscible block and thus changes the morphology of the immiscible block in the resulting cured epoxy resin composition.

19. The composition of claim 1 wherein the epoxy resin has an epoxide equivalent weight of from 150 to 3000.

20. The composition of claim 1 including a solvent.

21. A process for preparing a curable ambient cure high-solids coating composition comprising mixing
   (a) an epoxy resin;
   (b) an amphiphilic block copolymer containing at least one epoxy resin miscible block segment and at least one epoxy resin immiscible block segment; wherein the immiscible block segment comprises at least one polyether structure; such that upon curing the epoxy resin composition, the toughness based on elongation at break of the resulting cured epoxy resin composition modified with said amphiphilic block copolymer is increased as compared to a cured epoxy resin composition without being modified with said amphiphilic block copolymer; and
   (c) a sufficient amount of a nitrogen-containing curing agent to cure the coating composition at ambient temperature of less than 60° C.

22. A process for preparing a coated substrate comprising:
   (I) contacting the substrate with a curable ambient cure high-solids coating composition comprising
      (a) an epoxy resin;
      (b) an amphiphilic block copolymer containing at least one epoxy resin miscible block segment and at least one epoxy resin immiscible block segment; wherein the immiscible block segment comprises at least one polyether structure; such that upon curing the epoxy resin composition, the toughness based on elongation at break of the resulting cured epoxy resin composition modified with said amphiphilic block copolymer is increased as compared to a cured epoxy resin composition without being modified with said amphiphilic block copolymer; and (c) a sufficient amount of a nitrogen-containing curing agent to cure the coating composition at ambient temperature of less than 60° C.; and (II) allowing the ambient cure high-solids coating composition to cure at a sufficient time and temperature to cure the coating composition.

23. A coated article made by the process of claim 22.

* * * * *